United States Patent
Morante

[11] 3,713,724
[45] Jan. 30, 1973

[54] INVERTED TELEPHOTO LENSES HAVING ELEMENTS IN EDGE CONTACT

[75] Inventor: Robert J. Morante, Rochester, N.Y.

[73] Assignee: Bausch & Lomb Incorporated, Rochester, N.Y.

[22] Filed: Dec. 20, 1971

[21] Appl. No.: 209,847

[52] U.S. Cl....................350/216, 350/178
[51] Int. Cl..............................G02b 9/60
[58] Field of Search........................350/216

[56] References Cited

UNITED STATES PATENTS

| 2,922,337 | 1/1960 | Glatzel | 350/216 X |
| 2,983,191 | 5/1961 | Lautenbacher | 350/216 |
| 3,467,464 | 9/1969 | Ruehl | 350/216 |

*Primary Examiner*—John K. Corbin
*Attorney*—Frank C. Paraker et al.

[57] ABSTRACT

An inverse telephoto lens has a negative singlet widely spaced from a positive group of five lens elements, four of which may be at least in edge contact.

6 Claims, 1 Drawing Figure

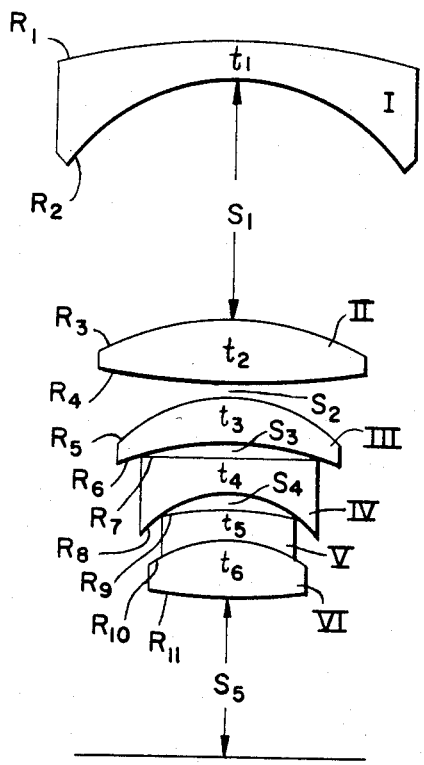

INVERTED TELEPHOTO LENSES HAVING ELEMENTS IN EDGE CONTACT

BACKGROUND OF THE INVENTION

1. Field of the Invention

The invention pertains to inverted telephoto lenses and more particularly those having six elements in five components.

2. Description of the Prior Art

While lenses following this general pattern are known (see, for example U.S. Pat. No. 2,983,191, Lautenbacher) the lens of my invention appears to be unique in having so many members of the positive group in edge contact thereby facilitating its assembly and alignment.

SUMMARY OF THE INVENTION

The invention comprises a family of inverted telephoto lenses having five components and six elements. Since these lenses may be employed either as photographic lenses or as projection lenses the usual front and rear conjugate nomenclature is inapt, and therefore reference will be made herein to long and short conjugates, the long conjugate corresponding to the front conjugate when the lens is used as a photographic lens.

Thus, the lens has first a negative meniscus or planoconcave lens designated I on the long conjugate side, concave to the short conjugate side. It constitutes the negative portion of the inverted telephoto lens, and accordingly is rather widely airspaced from the first component of the positive group, biconvex lens II. The remaining lenses may be at least in edge contact with one another and the first of them is positive meniscus lens III concave to the short side, preferably edge contacted with biconcave or plano-concave lens IV having its shallowest curvature preferably in edge contact with lens III. The sharper curve of lens IV is preferably in edge contact with the fifth component, a doublet, of which lens V is a negative meniscus concave to the short side and in surface contact with lens VI which is biconvex.

The lenses in question feature a good freedom from distortion, image point displacement being held to no more than three percent, and good flatness of field.

DESCRIPTION OF THE DRAWING

The drawing is an optical diagram illustrating the relative shapes, thicknesses and spaces of the components and elements of the lens of my invention.

DESCRIPTION OF THE PREFERRED EMBODIMENT

The lens of my invention is represented in two primary designs A and B, design A being intended primarily as a photographic lens for use with a phototube and therefore having special corrections for green, red, and infrared light. Design B, on the other hand, is corrected in the visible ranges and is intended for use as a microprojection lens.

The construction data are set forth in the following table wherein the numerals given are ratioed to the focal length of the lens, positive radii being taken as centered on the short conjugate side. The field half-angles respectively for lenses A and B are 25.6° and 22.5°, and their relative apertures are respectively $f/2.8$ and $f/2.0$.

As keyed to the drawing, and following customary lens design notation, the radii are identified by R, the element thicknesses by $t$, the element separations by S, the refractive indices measured on the Fraunhofer D lines by $n_D$ and the Abbe numbers, or dispersion values, by $\nu$, each with numerical subscript of sequential increasing value from the long conjugate toward the short.

TABLE

| Radii | A | B | Distances | A | B | Glasses | A | B |
|---|---|---|---|---|---|---|---|---|
| $R_1$ | ∞ | 2.596 | $t_1$ | 0.135 | 0.146 | $n_{D1}$ | 1.613 | 1.613 |
| $R_2$ | 0.632 | 0.758 | $t_2$ | 0.354 | 0.250 | $n_{D2}$ | 1.697 | 1.697 |
| $R_3$ | 0.922 | 0.961 | $t_3$ | 0.177 | 0.184 | $n_{D3}$ | 1.697 | 1.697 |
| $-R_4$ | 1.798 | 3.950 | $t_4$ | 0.120 | 0.125 | $n_{D4}$ | 1.689 | 1.689 |
| $R_5$ | 0.580 | 0.625 | $t_5$ | 0.100 | 0.104 | $n_{D5}$ | 1.648 | 1.648 |
| $R_6$ | 1.006 | 1.396 | $t_6$ | 0.199 | 0.208 | $n_{D6}$ | 1.691 | 1.691 |
| $-R_7$ | 3.037 | 31.3 | $S_1$ | 0.366 | 0.860 | $\nu_1$ | 58.6 | 58.6 |
| $R_8$ | 0.443 | 0.419 | $S_2$ | 0.008 | 0.008 | $\nu_2$ | 55.6 | 55.6 |
| $R_9$ | 1.109 | 1.447 | $S_3$ | 0.061 | 0.042 | $\nu_3$ | 55.6 | 55.6 |
| $R_{10}$ | 0.443 | 0.512 | $S_4$ | 0.057 | 0.059 | $\nu_4$ | 31.0 | 31.0 |
| $-R_{11}$ | 0.988 | 1.578 | | | | $\nu_5$ | 33.8 | 33.8 |
| | | | | | | $\nu_6$ | 54.8 | 54.8 |

While the designs A and B were made in response to certain specific performance goals for excellent performance with light input at certain particular frequencies, other designs whose data fall within the listed range of radii, thicknesses and spacings, and having glass types exhibiting refractive indices within 0.002 and dispersions within two units of those given, are thought to be capable of useful performances under perhaps restricted conditions.

I claim:

1. A five component inverted telephoto lens having a negative singlet airspaced from a five element positive group and having construction data within the following ranges:

| | | | | | | | | |
|---|---|---|---|---|---|---|---|---|
| 2.596 | ≤ | $R_1$ | ≤ | ∞ | 0.366 | ≤ | $S_1$ | ≤ | 0.860 |
| 0.632 | ≤ | $R_2$ | ≤ | 0.758 | 0.0075 | ≤ | $S_2$ | ≤ | 0.0085 |
| 0.922 | ≤ | $R_3$ | ≤ | 0.961 | 0.042 | ≤ | $S_3$ | ≤ | 0.061 |
| 1.798 | ≤ | $-R_4$ | ≤ | 3.950 | 0.057 | ≤ | $S_4$ | ≤ | 0.059 |
| 0.580 | ≤ | $R_5$ | ≤ | 0.625 | 1.611 | ≤ | $n_{D1}$ | ≤ | 1.615 |
| 1.006 | ≤ | $R_6$ | ≤ | 1.396 | 1.695 | ≤ | $n_{D2}$ | ≤ | 1.699 |
| 3.037 | ≤ | $-R_7$ | ≤ | 31.3 | 1.695 | ≤ | $n_{D3}$ | ≤ | 1.699 |
| 0.419 | ≤ | $R_8$ | ≤ | 0.443 | 1.687 | ≤ | $n_{D4}$ | ≤ | 1.691 |
| 1.109 | ≤ | $R_9$ | ≤ | 1.447 | 1.646 | ≤ | $n_{D5}$ | ≤ | 1.650 |
| 0.443 | ≤ | $R_{10}$ | ≤ | 0.512 | 1.689 | ≤ | $n_{D6}$ | ≤ | 1.693 |
| 0.988 | ≤ | $-R_{11}$ | ≤ | 1.578 | 56.6 | ≤ | $\nu_1$ | ≤ | 60.6 |
| 0.135 | ≤ | $t_1$ | ≤ | 0.146 | 53.6 | ≤ | $\nu_2$ | ≤ | 57.6 |
| 0.250 | ≤ | $t_2$ | ≤ | 0.354 | 53.6 | ≤ | $\nu_3$ | ≤ | 57.6 |
| 0.177 | ≤ | $t_3$ | ≤ | 0.184 | 29.0 | ≤ | $\nu_4$ | ≤ | 33.0 |
| 0.120 | ≤ | $t_4$ | ≤ | 0.125 | 31.8 | ≤ | $\nu_5$ | ≤ | 35.8 |
| 0.100 | ≤ | $t_5$ | ≤ | 0.104 | 52.8 | ≤ | $\nu_6$ | ≤ | 56.8 |
| 0.199 | ≤ | $t_6$ | ≤ | 0.208 | | | | | |

2. The lens of claim 1 having construction data substantially as follows:

| | | | | | |
|---|---|---|---|---|---|
| $R_1$ | ∞ | $t_1$ | .135 | $n_{D1}$ | 1.613 |
| $R_2$ | .632 | $t_2$ | .354 | $n_{D2}$ | 1.697 |
| $R_3$ | .922 | $t_3$ | .177 | $n_{D3}$ | 1.697 |
| $-R_4$ | 1.798 | $t_4$ | .120 | $n_{D4}$ | 1.689 |
| $R_5$ | .580 | $t_5$ | .100 | $n_{D5}$ | 1.648 |
| $R_6$ | 1.006 | $t_6$ | .199 | $n_{D6}$ | 1.691 |
| $-R_7$ | 3.037 | $S_1$ | .366 | $\nu_1$ | 58.6 |
| $R_8$ | .443 | $S_2$ | .008 | $\nu_2$ | 55.6 |
| $R_9$ | 1.109 | $S_3$ | .061 | $\nu_3$ | 55.6 |
| $R_{10}$ | .443 | $S_4$ | .057 | $\nu_4$ | 31.0 |
| $-R_{11}$ | .988 | | | $\nu_5$ | 33.8 |
| | | | | $\nu_6$ | 54.8 |

3. The lens of claim 1 having construction data substantially as follows:

| | | | | | | | |
|---|---|---|---|---|---|---|---|
| $R_1$ | 2.596 | $t_1$ | .146 | $n_{D1}$ | 1.163 | | |
| $R_2$ | .758 | $t_2$ | .250 | $n_{D2}$ | 1.697 | | |
| $R_3$ | .961 | $t_3$ | .184 | $n_{D3}$ | 1.697 | | |
| $-R_4$ | 3.950 | $t_4$ | .125 | $n_{D4}$ | 1.689 | | |
| $R_5$ | .625 | $t_5$ | .104 | $n_{D5}$ | 1.648 | | |
| $R_6$ | 1.396 | $t_6$ | .208 | $n_{D6}$ | 1.691 | | |
| $-R_7$ | 31.3 | $S_1$ | .860 | $\eta_1$ | 58.6 | | |
| $R_8$ | .419 | $S_2$ | .008 | $\eta_2$ | 55.6 | | |
| $R_9$ | 1.447 | $S_3$ | .042 | $\eta_3$ | 55.6 | | |
| $R_{10}$ | .512 | $S_4$ | .059 | $\eta_4$ | 31.0 | | |
| $-R_{11}$ | 1.578 | | | $\eta_5$ | 33.8 | | |
| | | | | $\eta_6$ | 54.8. | | |

4. The lens of claim 1 having the third, fourth and fifth elements in edge contact with one another.

5. The lens of claim 2 having the third, fourth and fifth elements in edge contact with one another.

6. The lens of claim 3 having the third, fourth and fifth elements in edge contact with one another.

* * * * *